United States Patent
Takeuchi (10) Patent No.: US 8,169,799 B2
(45) Date of Patent: May 1, 2012

(54) POWER FACTOR CORRECTION CIRCUIT (75) Inventor: Toshirou Takeuchi, Niiza (JP)

(73) Assignee: Sanken Electric Co., Ltd., Niiza-shi (JP)

(*) Notice: Subject to any disclaimer, the term of this patent is extended or adjusted under 35 U.S.C. 154(b) by 415 days.

(21) Appl. No.: 12/469,335

(22) Filed: May 20, 2009

(65) Prior Publication Data

US 2009/0310386 A1 Dec. 17, 2009

(30) Foreign Application Priority Data

Jun. 11, 2008 (JP) ................................. 2008-152996

(51) Int. Cl.
*H02M 3/335* (2006.01)
*G05F 5/00* (2006.01)
(52) U.S. Cl. ..................... 363/21.12; 323/301
(58) Field of Classification Search .................... 363/16, 363/20, 21.01, 21.12–21.15, 51.01, 51.03, 363/84, 89, 95, 97, 55, 56.01; 323/222, 225, 323/268, 271, 282, 285, 299, 301
See application file for complete search history.

(56) References Cited

U.S. PATENT DOCUMENTS

| | | | | |
|---|---|---|---|---|
| 5,440,473 A | * | 8/1995 | Ishii et al. ................. | 363/21.05 |
| 5,457,622 A | * | 10/1995 | Arakawa ..................... | 363/59 |
| 7,733,678 B1 | * | 6/2010 | Notohamiprodjo et al. ... | 363/89 |
| 2010/0097041 A1 | * | 4/2010 | Ayukawa et al. ........... | 323/272 |

FOREIGN PATENT DOCUMENTS

JP 7-135774 5/1995

* cited by examiner

*Primary Examiner* — Matthew Nguyen
(74) *Attorney, Agent, or Firm* — Obon, Spivak, McClelland, Maier & Neustadt, L.L.P.

(57) ABSTRACT

A power factor correction circuit steps up and power-factor-corrects a rectified voltage, which has been rectified from an AC input voltage of an AC power source Vin, through an ON/OFF operation of a switching element Q1 and supplies a stepped-up output voltage to a DC-DC converter that is driven with a first pulse signal. The power factor correction circuit includes a delay circuit to receive the first pulse signal whose pulse width corresponds to an output voltage of the DC-DC converter, generate, in response to an ON pulse of the first pulse signal, a delay pulse signal whose pulse width corresponds to the rectified voltage, and synthesize the first pulse signal and the delay pulse signal into a second pulse signal. The power factor correction circuit also includes a driver to drive the switching element according to the second pulse signal.

7 Claims, 12 Drawing Sheets

FIG. 1

PRIOR ART

RECTIFIED-AND-DIVIDED-VOLTAGE SIGNAL f

POWER FACTOR CORRECTION CIRCUIT

BACKGROUND OF THE INVENTION

1. Field of the Invention

The present invention relates to a power factor correction circuit to deal with restrictions for high frequencies and ENERGY STAR requirements for a single voltage power source (AC/DC).

2. Description of the Related Art

Figure 1:
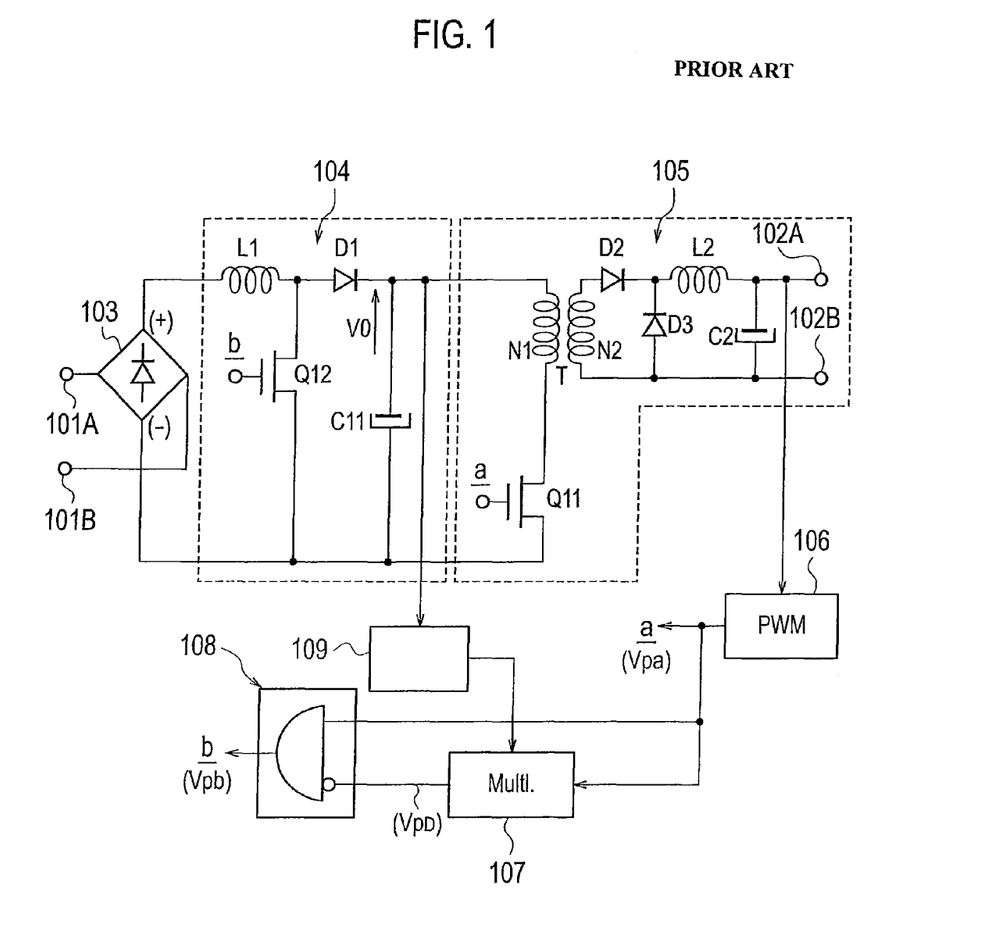
FIG. 1 is a circuit diagram illustrating an AC-DC converter including a power factor correction circuit according to a related art.

FIG. 1 is a circuit diagram illustrating an AC-DC converter including a power factor correction circuit according to a related art. In FIG. 1, the AC-DC converter has a rectifier 103 to rectify an AC input voltage from an AC power source into a rectified voltage, a step-up chopper 104 to step up the rectified voltage, and a DC-DC converter 105 to convert the stepped-up voltage into a stabilized DC voltage.

The AC-DC converter also has a PWM circuit 106, a one-shot multivibrator 107, a pulse synthesizer 108, and a comparator 109.

The PWM circuit 106 generates a pulse signal Vpa according to an output voltage from the DC-DC converter 105 and provides the pulse signal Vpa as a first pulse signal to the one-shot multivibrator 107 and pulse synthesizer 108.

Based on the pulse signal Vpa from the PWM circuit 106 and a delay pulse VpD from the one-shot multivibrator 107, the pulse synthesizer 108 generates a pulse signal Vpb whose pulse width is narrower than the pulse width of the pulse signal Vpa by the pulse width of the delay pulse VpD.

The comparator 109 compares a stepped-up voltage V0 from the step-up chopper 104 with a reference voltage Vref, and if V0 is smaller than Vref, stops the generation of the delay pulse VpD.

This related art is disclosed in Japanese Unexamined Patent Application Publication No. H07-135774.

SUMMARY OF THE INVENTION

The delay pulse VpD employed by the AC-DC converter of the related art is invariable, and therefore, the related art is unable to achieve a power factor correcting ratio specified by restrictions for high frequencies. Due to the invariable delay pulse VpD, the step-up chopper 104 of the related art demonstrates a poor step-up ratio and an insufficient power factor correcting ratio at the bottom of a full-wave-rectified waveform generated from an AC input voltage by the rectifier 103.

Because of the same reason, the related art is unable to meet a new requirement LEVEL V of ENERGY STAR for a single-output power source drafted by EPA of the United States. LEVEL V requires a power factor of 0.9 or over for an input voltage of AC 115 V/230 V.

The present invention provides a power factor correction circuit that is simple, inexpensive, and capable of complying with LEVEL V of ENERGY STAR.

According to a first aspect of the present invention, there is provided a power factor correction circuit for stepping up and power-factor-correcting a rectified voltage, which has been rectified from an AC input voltage, through an ON/OFF operation of a switching element and supplying a stepped-up output voltage to a DC-DC converter that is driven with a first pulse signal. The power factor correction circuit includes a delay circuit configured to receive the first pulse signal whose pulse width corresponds to an output voltage of the DC-DC converter, generate, in response to an ON pulse of the first pulse signal, a delay pulse signal whose pulse width corresponds to the rectified voltage, and synthesize the first pulse signal and the delay pulse signal into a second pulse signal. The power factor correction circuit also includes a driver configured to drive the switching element according to the second pulse signal.

According to a second aspect of the present invention, the delay circuit has a corrector configured to narrow a pulse width of the delay pulse signal if the stepped-up output voltage is smaller than a predetermined voltage.

According to a third aspect of the present invention, the second pulse signal generated by the delay circuit has a pulse width that is narrower than the pulse width of the first pulse signal by the pulse width of the delay pulse signal.

DESCRIPTION OF THE PREFERRED EMBODIMENT

Power factor correction circuits according to embodiments of the present invention will be explained in detail with reference to the drawings.

Embodiment 1

Figure 2:
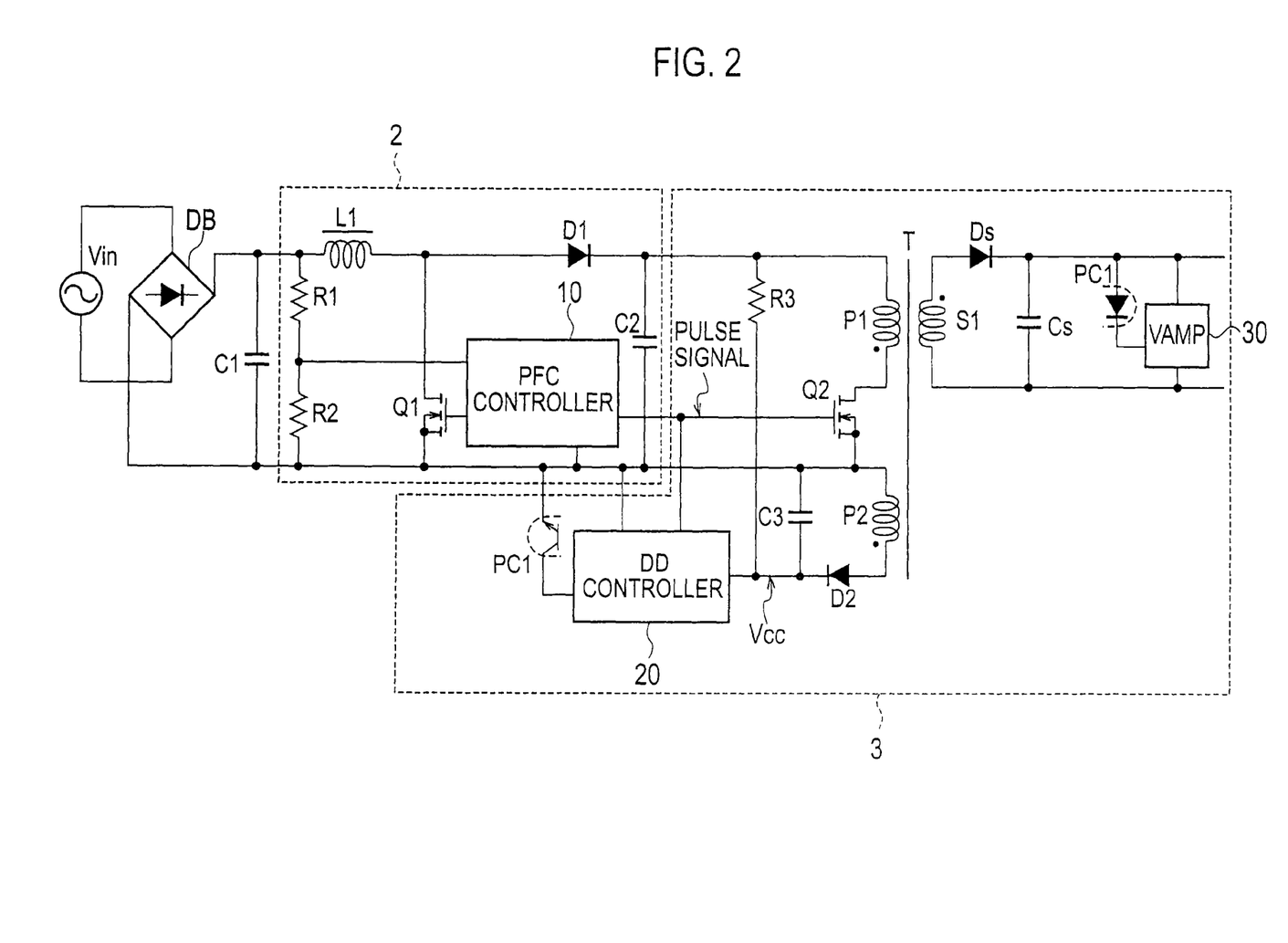
FIG. 2 is a circuit diagram illustrating an AC-DC converter including a power factor correction circuit according to Embodiment 1 of the present invention.

FIG. 2 is a circuit diagram illustrating an AC-DC converter including a power factor correction circuit according to Embodiment 1 of the present invention. The AC-DC converter includes a rectifier DB rectifying an AC input voltage from an AC power source Vin into a rectified voltage, a smoothing capacitor C1 connected to an output end of the rectifier DB, a power factor correction (PFC) circuit 2 stepping up the rectified voltage and correcting a power factor of the same, and a DC-DC converter 3 converting the stepped-up voltage from the power factor correction circuit 2 into a DC voltage and supplying the DC voltage to a load.

The DC-DC converter 3 has a series circuit including a primary winding P1 of a transformer T1 and a switching element Q2 made of a MOSFET, the series circuit being connected to a capacitor C2 of the power factor correction circuit 2. Both ends of a secondary winding S1 of the transformer T1 are connected to a series circuit including a diode Ds and a capacitor Cs. Both ends of the capacitor Cs are connected to a voltage detecting amplifier (VAMP) 30 to detect an output voltage of the capacitor Cs. The voltage detecting amplifier 30 is connected to a photocoupler PC1. The photocoupler PC1 outputs a current corresponding to the output voltage detected by the voltage detecting amplifier 30 to a DC-DC converter controller (hereinafter referred to as "DD controller") 20.

Both ends of an auxiliary winding P2 of the transformer T1 are connected to a series circuit including a diode D2 and a capacitor C3. A connection point of the diode D2 and capacitor C3 is connected to the DD controller 20 and a first end of a resistor R3 that is used to start the DD controller 20.

The DD controller 20 generates a pulse signal whose pulse width corresponds to the output voltage of the photocoupler PC1. The pulse signal turns on/off the switching element Q2 to control the output voltage to a predetermined value.

The power factor correction circuit 2 will be explained in detail. The power factor correction circuit 2 acts as a step-up chopper. Both ends of the smoothing capacitor C1 are connected to a series circuit including a step-up reactor L1 and a switching element Q1 made of a MOSFET. Connected between drain and source of the switching element Q1 is a series circuit including a diode D1 and the capacitor C2.

Output ends of the rectifier DB are connected to a series circuit including resistors R1 and R2. A connection point of the resistors R1 and R2 is connected to a power factor correction controller (hereinafter referred to as "PFC controller") 10. The PFC controller 10 receives from the DD controller 20 of the DC-DC converter 3 the gate pulse signal (referred to as "pulse signal") for the switching element Q2 and applies a pulse signal to a gate of the switching element Q1. Based on the pulse signal for the switching element Q2 and a voltage that is obtained by dividing the rectified voltage from the rectifier DB by the resistors R1 and R2, the PFC controller 10 turns on/off the switching element Q1, to thereby correct a power factor.

Figure 3:
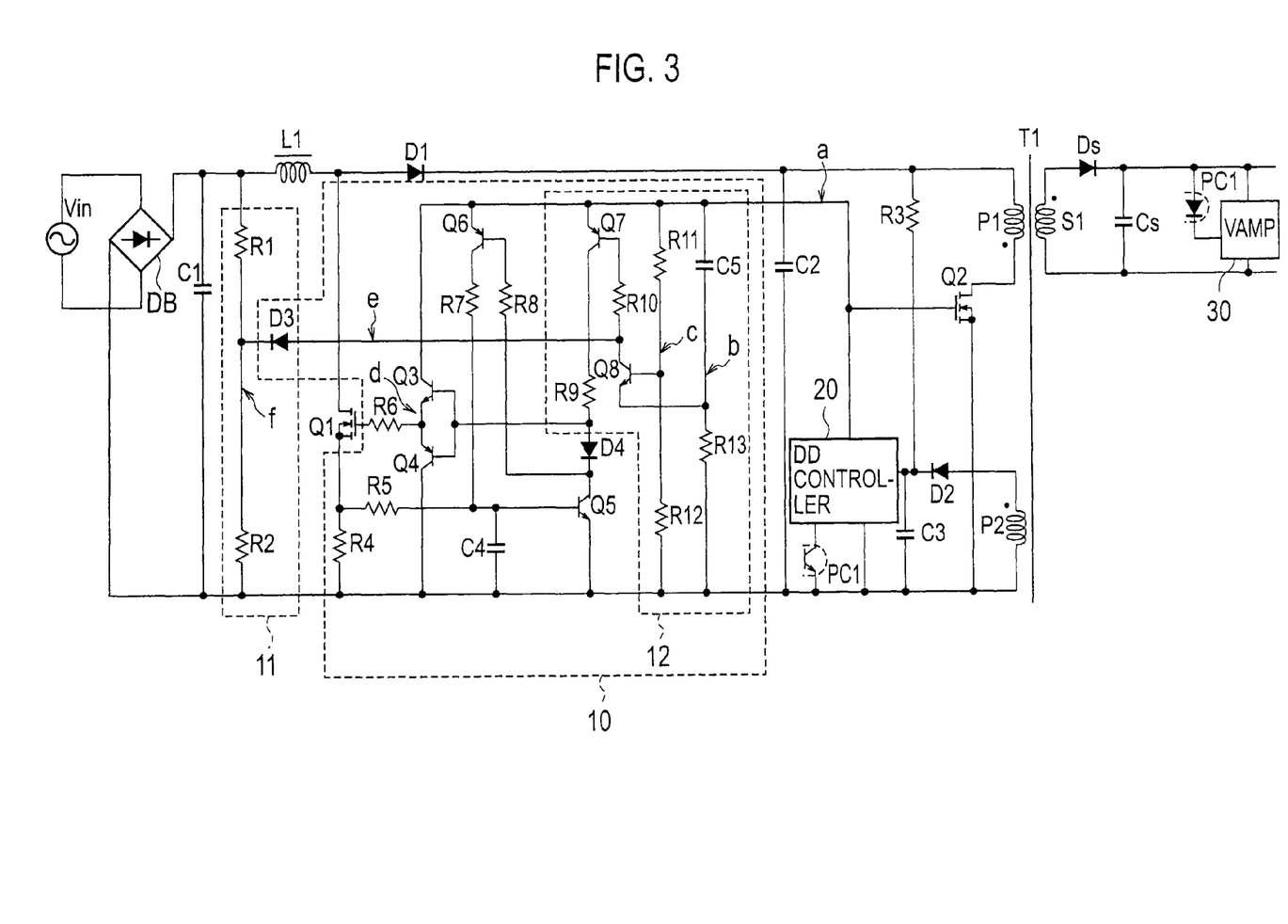
FIG. 3 is a circuit diagram illustrating the details of a PFC controller in the power factor correction circuit of FIG. 2.

FIG. 3 is a circuit diagram illustrating the details of the PFC controller 10 in the power factor correction circuit 2 according to Embodiment 1. In FIG. 3, the detector having the resistors R1 and R2 detects a rectified voltage prepared from an AC input voltage and provides a cathode of a diode D3 with the detected voltage.

The PFC controller 10 includes a delay circuit 12, a driver, and an overcurrent protector. The delay circuit 12 receives the pulse signal (first pulse signal) from the DD controller 20, and when the pulse signal provides an ON pulse, generates a delay pulse signal whose pulse width corresponds to the rectified voltage prepared from the AC input voltage. The delay circuit 12 synthesizes the pulse signal and delay pulse signal, to generate a PFC gate signal (second pulse signal). According to the PFC gate signal, the driver including elements Q3, Q4, and R6 drives the switching element Q1. The overcurrent protector includes elements R4, R5, C4, Q5, R7, R8, Q6, and D4 and is configured to limit a current passing through the switching element Q1.

In the delay circuit 12, a series circuit including a capacitor C5 and a resistor R13 is connected between a terminal of the DD controller 20 on the gate side of the switching element Q2 and a negative electrode terminal of the rectifier DB. The series circuit of C5 and R13 is also connected to a series circuit including resistors R11 and R12.

A connection point of the resistors R11 and R12 is connected to a base of a transistor Q8. An emitter of the transistor Q8 is connected to a connection point of the capacitor C5 and resistor R13. The gate side terminal of the DD controller 20 is connected to an emitter of a transistor Q7. A base of the transistor Q7 is connected through a resistor R10 to an anode of the diode D3 and a collector of the transistor Q8. A cathode of the diode D3 is connected to a connection point of the resistors R1 and R2.

A collector of the transistor Q7 is connected through a resistor R9 to a base of the transistor Q3, a base of the transistor Q4, and an anode of the diode D4. A cathode of the diode D4 is connected to a collector of the transistor Q5 and a first end of the resistor R8. An emitter of the transistor Q5 is connected to the negative electrode terminal of the rectifier DB. A base of the transistor Q5 is connected to a first end of the resistor R5, a first end of the resistor R7, and a first end of the capacitor C4.

In the driver, a collector of the transistor Q3 is connected to the gate side terminal of the DD controller 20. An emitter of the transistor Q3 is connected to an emitter of the transistor Q4 and a first end of the resistor R6. A second end of the resistor R6 is connected to the gate of the switching element Q1. A collector of the transistor Q4 is connected to the negative electrode terminal of the rectifier DB. The overcurrent protector will be explained later.

Figure 4:
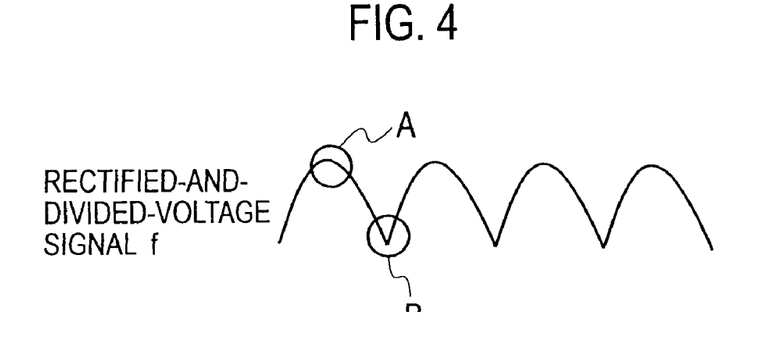
FIG. 4 illustrates a rectified-and-divided-voltage signal in the PFC controller of FIG. 3 prepared from an AC input voltage.
Figure 5:
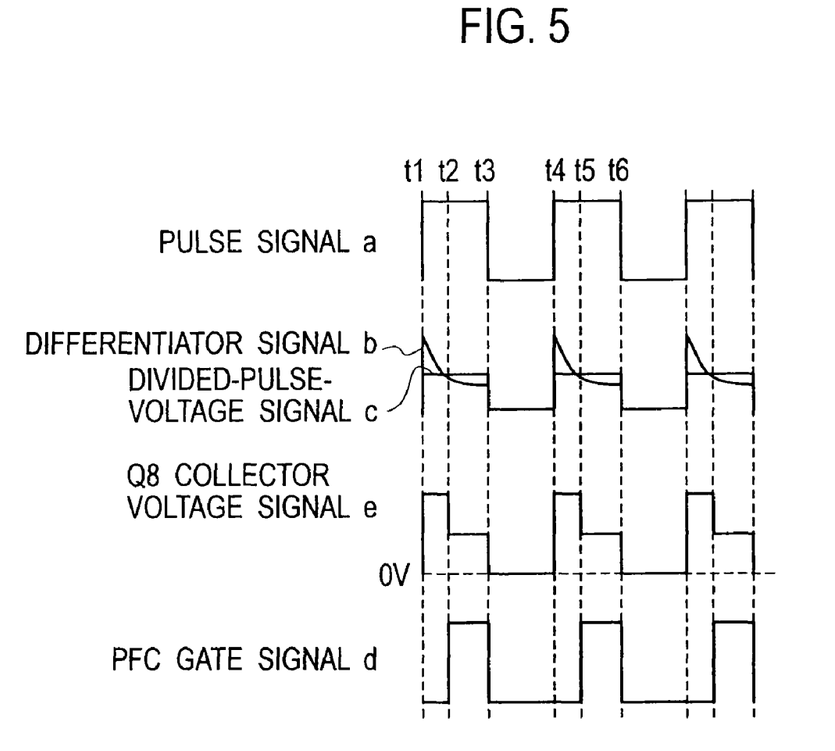
FIG. 5 is a timing chart illustrating signals in a delay circuit in the PFC controller of FIG. 3, these signals being generated in a top zone of the rectified-and-divided-voltage signal under rated load.
Figure 6:
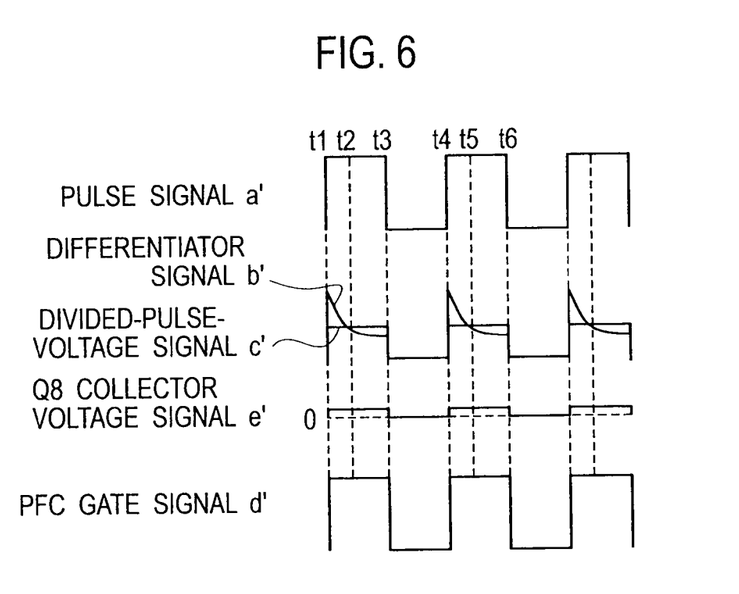
FIG. 6 is a timing chart illustrating signals in the delay circuit in the PFC controller of FIG. 3, these signals being generated in a bottom zone of the rectified-and-divided-voltage signal under rated load.

Operation of the PFC controller 10 illustrated in FIG. 3 will be explained with reference to FIGS. 4 to 6. FIG. 4 illustrates a rectified-and-divided-voltage signal f prepared from an AC input voltage. FIG. 5 is a timing chart illustrating signals in the delay circuit 12 when the rectified-and-divided-voltage signal f is in a top zone A under rated load. FIG. 6 is a timing chart illustrating signals in the delay circuit 12 when the rectified-and-divided-voltage signal f is in a bottom zone B under rated load.

The delay circuit 12 receives the pulse signal from the DD controller 20, and when the pulse signal provides an ON pulse, generates a delay pulse signal having a pulse width that corresponds to a collector voltage signal of the transistor Q8 that is based on the rectified voltage prepared by rectifying the AC input voltage. And the delay circuit 12 synthesizes the pulse signal and delay pulse signal and generates a PFC gate signal. The PFC gate signal has a pulse width that is narrower than the pulse width of the pulse signal by the pulse width of the delay pulse signal.

The delay circuit 12 widens the pulse width of the delay pulse signal as the rectified voltage increases, to reduce the pulse width of the PFC gate signal narrower than the pulse width of the pulse signal. The delay circuit 12 narrows the pulse width of the delay pulse signal as the rectified voltage decreases. When the rectified voltage enters a bottom zone, the delay circuit 12 zeroes the pulse width of the delay pulse signal.

Operation of the delay circuit 12 when the rectified-and-divided-voltage signal f is in the top zone A will be explained with reference to FIG. 5. A pulse signal a from the DD controller 20 is divided by the resistors R11 and R12, to provide a c-point voltage (divided-pulse-voltage signal c). The capacitor C5 and resistor R13 form a differentiator that provides a b-point voltage (differentiator signal b). When a differential voltage between the b-point voltage and the c-point voltage reaches a base-emitter voltage Vbe of the transistor Q8, the transistor Q8 turns on.

When the rectified-and-divided-voltage signal f is in the top zone A, the rectified voltage at the connection point of the resistors R1 and R2 is higher than an e-point potential, and therefore, the diode D3 is OFF.

At time t1, the pulse signal a from the DD controller 20 provides an ON pulse. At this time, the differentiator signal b, i.e., the b-point voltage of the differentiator having the capacitor C5 and resistor R13 starts to gradually decrease as illustrated in FIG. 5. At time t2, the differentiator signal b decreases lower than the c-point potential, i.e., the divided-pulse-voltage signal c by the base-emitter voltage Vbe of the transistor Q8 and a PFC gate signal d is provided. The PFC gate signal d turns on the transistor Q3, to turn on the switching element Q1.

When the pulse signal a from the DD controller 20 becomes zero, a current passes through a route extending along the gate of the switching element Q1, the emitter and base of the transistor Q4, and the base and collector of the transistor Q3. As results, the transistor Q4 turns on and the gate voltage of the switching element Q1 becomes zero to turn off the switching element Q1.

In this way, when the rectified voltage at the connection point f of the resistors R1 and R2 is high, the delay circuit 12 outputs the PFC gate signal d having a delay time that is fixed according to a time constant determined by the capacitor C5 and resistor R13.

Operation of the delay circuit 12 when the rectified-and-divided-voltage signal f is in the bottom zone B will be explained with reference to FIG. 6. In FIG. 6, a collector voltage signal e' of the transistor Q8 is nearly zero.

When the rectified voltage at the connection point f of the resistors R1 and R2 becomes equal to or lower than a voltage obtained by subtracting a base-emitter voltage Vbe of the transistor Q7 and a forward voltage of the diode D3 from the voltage of the pulse signal a of the DD controller 20, the pulse signal a of the DD controller 20 passes a current through a route extending along the transistor Q7, the resistor R10, the diode D3, the resistor R2, and the ground.

As results, the transistor Q7 keeps an ON state in a period in which the pulse signal a from the DD controller 20 is ON. Even in the period from t1 to t2, a PFC gate signal d' becomes ON in synchronization with the pulse signal a from the DD controller 20.

Namely, when the rectified voltage based on the AC input voltage is in the bottom zone B, the delay time is zeroed, and when the rectified voltage is in the top zone A, the PFC pulse signal is provided with a predetermined delay time and is outputted to the switching element Q1, thereby correcting a power factor.

Consequently, Embodiment 1 decreases a step-up ratio and sufficiently corrects a power factor, to comply with the new requirement LEVEL V of ENERGY START at low cost.

Figure 7:
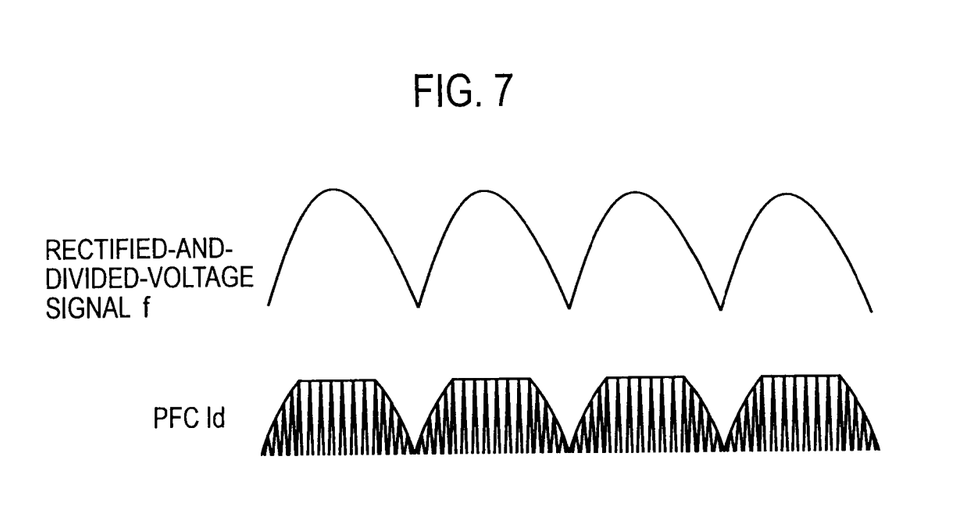
FIG. 7 illustrates a rectified-and-divided-voltage signal f obtained from an AC input voltage and a drain current PFCId passing through a switching element Q1 in the PFC controller of FIG. 3.
Figure 8:
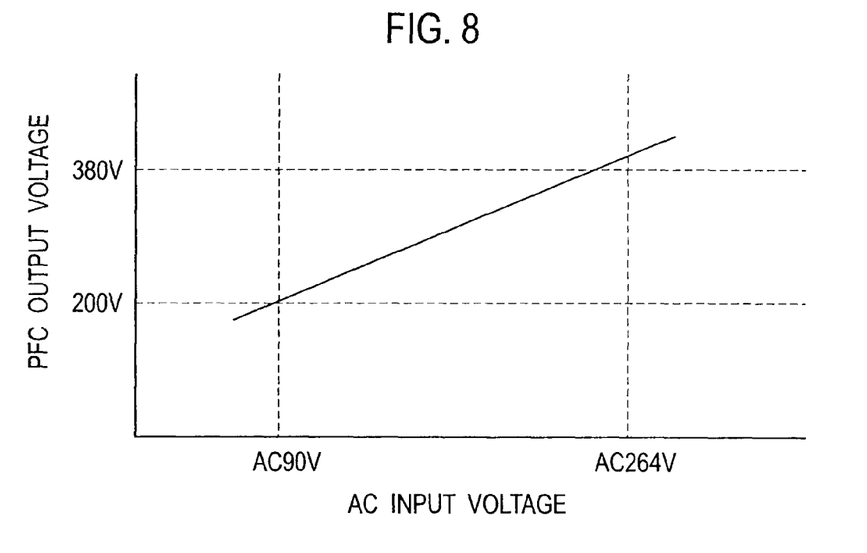
FIG. 8 illustrates a relationship between AC input voltage and PFC output voltage according to Embodiment 1.

FIG. 7 illustrates waveforms of a rectified-and-divided-voltage signal f based on an AC input voltage and a drain current PFCId passing through the switching element Q1. FIG. 8 illustrates a relationship between AC input voltage and PFC output voltage.

Figure 9:
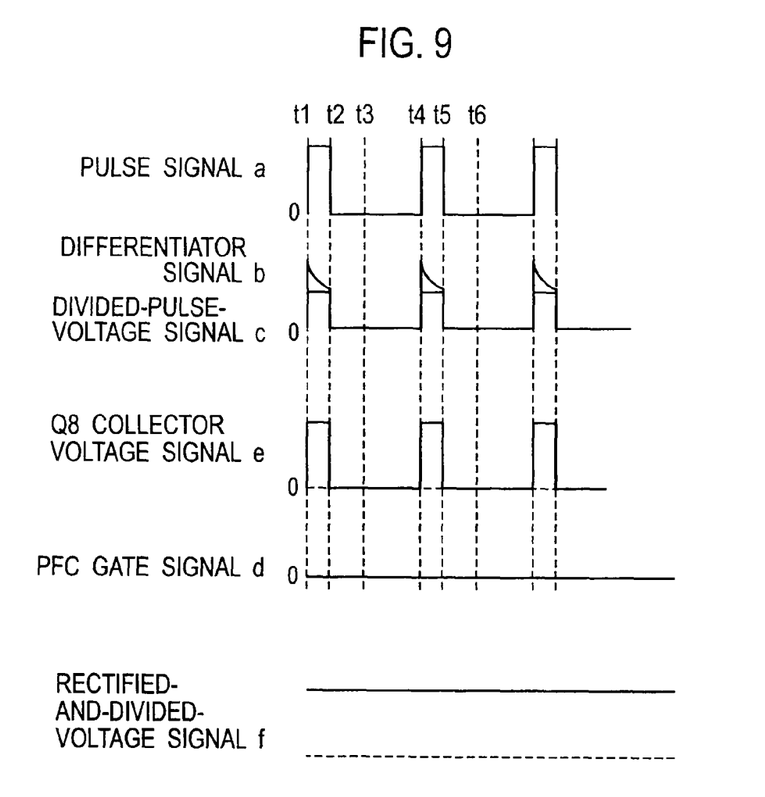
FIG. 9 is a timing chart illustrating waveforms of signals in the power factor correction circuit of FIG. 2 under light load.

When the load is light to reduce a load current, a current passing through the load decreases and the pulse width of the pulse signal a from the DD controller 20 narrows to stabilize an output voltage from the DC-DC converter 3. FIG. 9 illustrates waveforms of signals in the power factor correction circuit 2 under light load. In FIG. 9, the pulse width of the pulse signal a is from time t1 to time t2. The delay time provided by the differentiator is unchanged irrespective of the load current, and therefore, the differentiator signal b is always higher than the divided-pulse-voltage signal c. Accordingly, the transistor Q8 keeps OFF.

Under light load, the capacitor C1 needs only a small discharge current, and therefore, a charging voltage of the capacitor C1 shows little change with respect to an input voltage waveform. Due to the influence of the charging voltage of the capacitor C1, the voltage at the voltage dividing point f of the rectified voltage is always higher than the voltage of the pulse signal a, and therefore, the transistor Q7 keeps OFF. As results, the PFC pulse signal d is not outputted when the pulse width of the pulse signal a from the DD controller 20 is shorter than the predetermined delay time.

As the load of the DC-DC converter 3 decreases, the delay circuit 12 reduces the pulse width of the PFC gate signal d narrower than the pulse width of the pulse signal a. When the load of the DC-DC converter 3 drops below predetermined load power, the delay circuit 12 zeroes the pulse width of the PFC gate signal d. Under light load, the power factor correction circuit 2 becomes inoperative to zero the power consumption thereof, thereby improving a conversion efficiency.

The overcurrent protector will be explained. The overcurrent protector protects the switching element Q1 from an overcurrent and includes the resistors R4 and R5 to detect a drain current of the switching element Q1, the capacitor C4 to prevent a malfunction due to noise, the transistor Q5 to detect a drain current of the switching element Q1, and the transistor Q6, resistors R8 and R7, and diode D4 to realize a latching operation of the transistor Q5.

A first end of the resistor R4 is connected to the source of the switching element Q1 and a second end of the resistor R4 is connected to the negative electrode terminal of the rectifier DB. A first end of the resistor R5 is connected to a connection point of the first end of the resistor R4 and the source of the switching element Q1. A second end of the capacitor C4 is connected to the negative electrode terminal of the rectifier DB.

A second end of the resistor R5 is connected to a first end of the resistor R7, a first end of the capacitor C4, and a base of the transistor Q5. A second end of the resistor R7 is connected to a collector of the transistor Q6. A base of the transistor Q6 is connected to a first end of the resistor R8. A second end of the resistor R8 is connected to a collector of the transistor Q5 and a cathode of the diode D4. An anode of the diode D4 is connected to a first end of the resistor R9, the base of the transistor Q3, and the base of the transistor Q4. An emitter of the transistor Q5 is connected to the negative electrode terminal of the rectifier DB. An emitter of the transistor Q6 is connected to the gate side terminal of the DD controller 20.

Operation of the overcurrent protector having the transistors Q5 and Q6 will be explained. When a voltage drop of the resistor R4 exceeds a threshold value for a base-emitter voltage Vbe of the transistor Q5, the transistor Q5 turns on and the transistor Q6 turns on to start a latching operation. In parallel with the latching operation, the bases of the transistors Q3 and Q4 are connected through the diode D4 to zero volts. As results, the gate of the switching element Q1 becomes zero volts, and therefore, the switching element Q1 instantaneously turns off.

If the overcurrent protector is provided with only the transistor Q5, the voltage Vbe of the transistor Q5 disappears when the switching element Q1 turns off, and therefore, the transistor Q5 turns off. If the pulse signal from the DD controller 20 is high at this time, a voltage is applied to the bases of the transistors Q3 and Q4, to drive the gate of the switching element Q1. Then, the switching element Q1 again turns on.

Namely, the switching element Q1 repeatedly turns on and off during the period in which the pulse signal from the DD controller 20 is high. This increases a switching loss of the switching element Q1, to cause a thermal destruction. To prevent this, the transistor Q5, once it is turned on, must be kept (latched) ON during one high-level pulse period of the pulse signal from the DD controller 20. Thus, the transistor Q6 is added to execute the latching operation of the transistor Q5.

Embodiment 2

Figure 10:
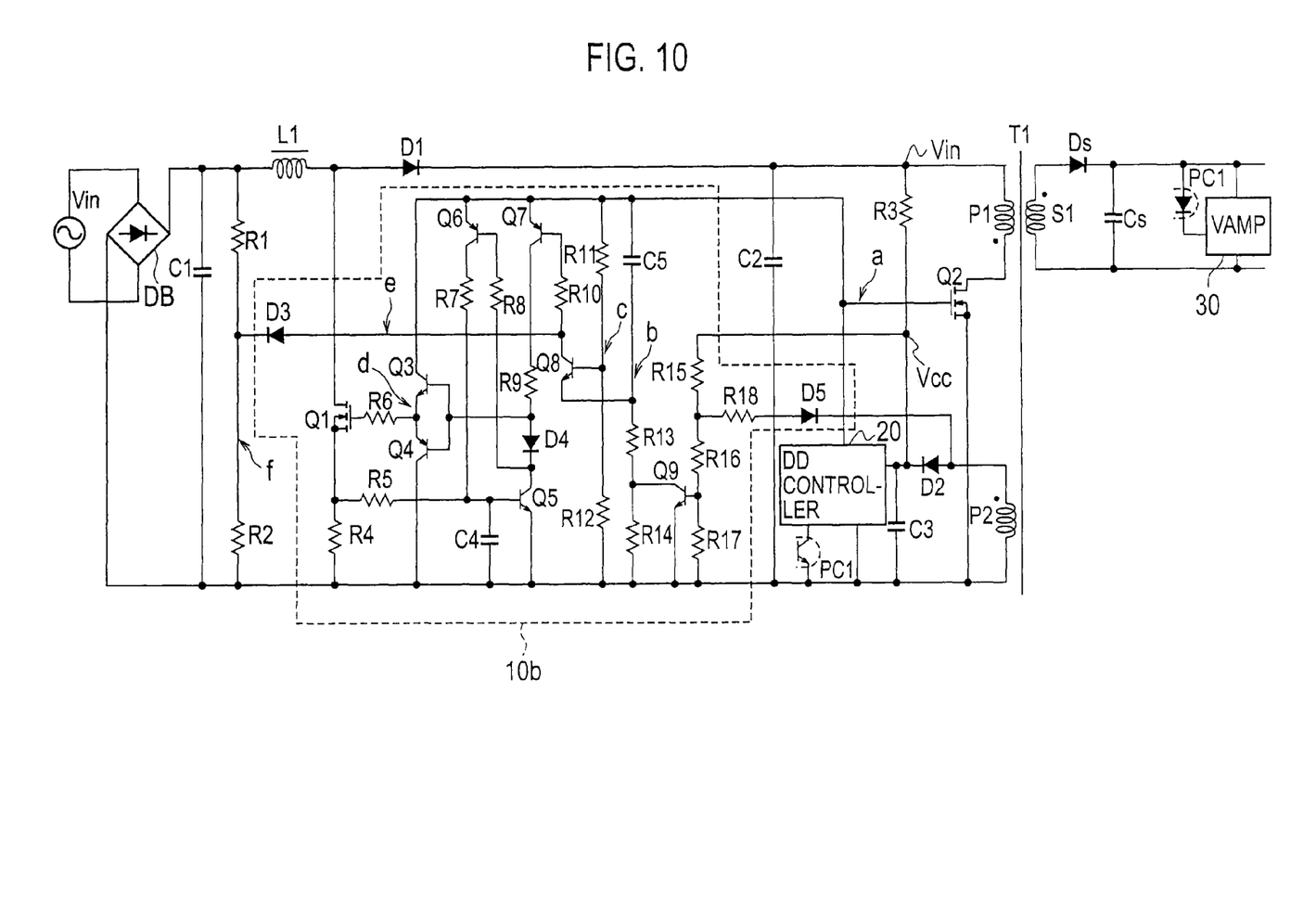
FIG. 10 is a circuit diagram illustrating the details of a PFC controller in a power factor correction circuit according to Embodiment 2 of the present invention.

FIG. 10 is a circuit diagram illustrating the details of a PFC (power factor correction) controller 10*b* in a power factor correction circuit according to Embodiment 2. According to Embodiment 1 of FIG. 3, the power factor correction circuit 2 does not monitor a stepped-up voltage, and therefore, a step-up operation continues even if an AC input voltage becomes excessively high.

The present embodiment deals with such an excessively high AC input voltage by correcting the pulse width of a delay pulse signal so as to improve a step-up ratio and power factor for a PFC output voltage.

The PFC controller 10*b* according to Embodiment 2 illustrated in FIG. 10 includes, in addition to the components of the PFC controller 10 according to Embodiment 1 illustrated in FIG. 3, an additional circuit including resistors R14 to R18, a transistor Q9, and a diode D5. This additional circuit forms a corrector that corrects the pulse width of a delay pulse signal according to a PFC output voltage.

A first end of a resistor R13 is connected to a first end of the resistor R14 and a collector of the transistor Q9. A base of the transistor Q9 is connected to a first end of the resistor R17 and a first end of the resistor R16. A second end of the resistor R14, an emitter of the transistor Q9, and a second end of the resistor R17 are connected to a negative electrode terminal of a rectifier DB.

A second end of the resistor R16 is connected to a first end of the resistor R15 and a first end of the resistor R18. A second end of the resistor R15 is connected to a first end of a resistor R3, a cathode of a diode D2, a first end of a capacitor C3, and a Vcc voltage terminal of a DD controller (DC-DC converter controller) 20. A second end of the resistor R18 is connected through the diode D5 to an anode of the diode D2 and a first end of an auxiliary winding P2 of a transformer T1. A second end of the auxiliary winding P2 is connected to the negative electrode terminal of the rectifier DB.

With this configuration, an ON-ON voltage of the auxiliary winding P2 of the transformer T1, which is a voltage in the same polar direction as a voltage of a primary winding P1 of the transformer T1, is a negative voltage proportional to a PFC output voltage. A voltage appearing between the ON-ON voltage of the auxiliary winding P2 and a +Vcc voltage is divided by the series-connected resistors R15 and R18 connected therebetween. A voltage between the voltage dividing point of the series-connected resistors R15 and R18 and the ground is divided by the resistors R16 and R17. The detected divided voltage is applied to the base of the transistor Q9.

The resistors R15 to R18 are adjusted such that the transistor Q9 turns on if the PFC output voltage is below a predetermined voltage.

When the PFC output voltage increases to the predetermined voltage, a voltage detected by the resistors R16 and R17 is lower than the base voltage of the transistor Q9 to turn off the transistor Q9. When the transistor Q9 turns off, an emitter resistance value of a transistor Q8 becomes equal to the sum of resistance values of the resistors R13 and R14. This increases a time constant of a differentiator including C5, R13, and R14, to elongate a delay time between when a pulse signal a is provided and when a transistor Q3 turns on.

Figure 11:
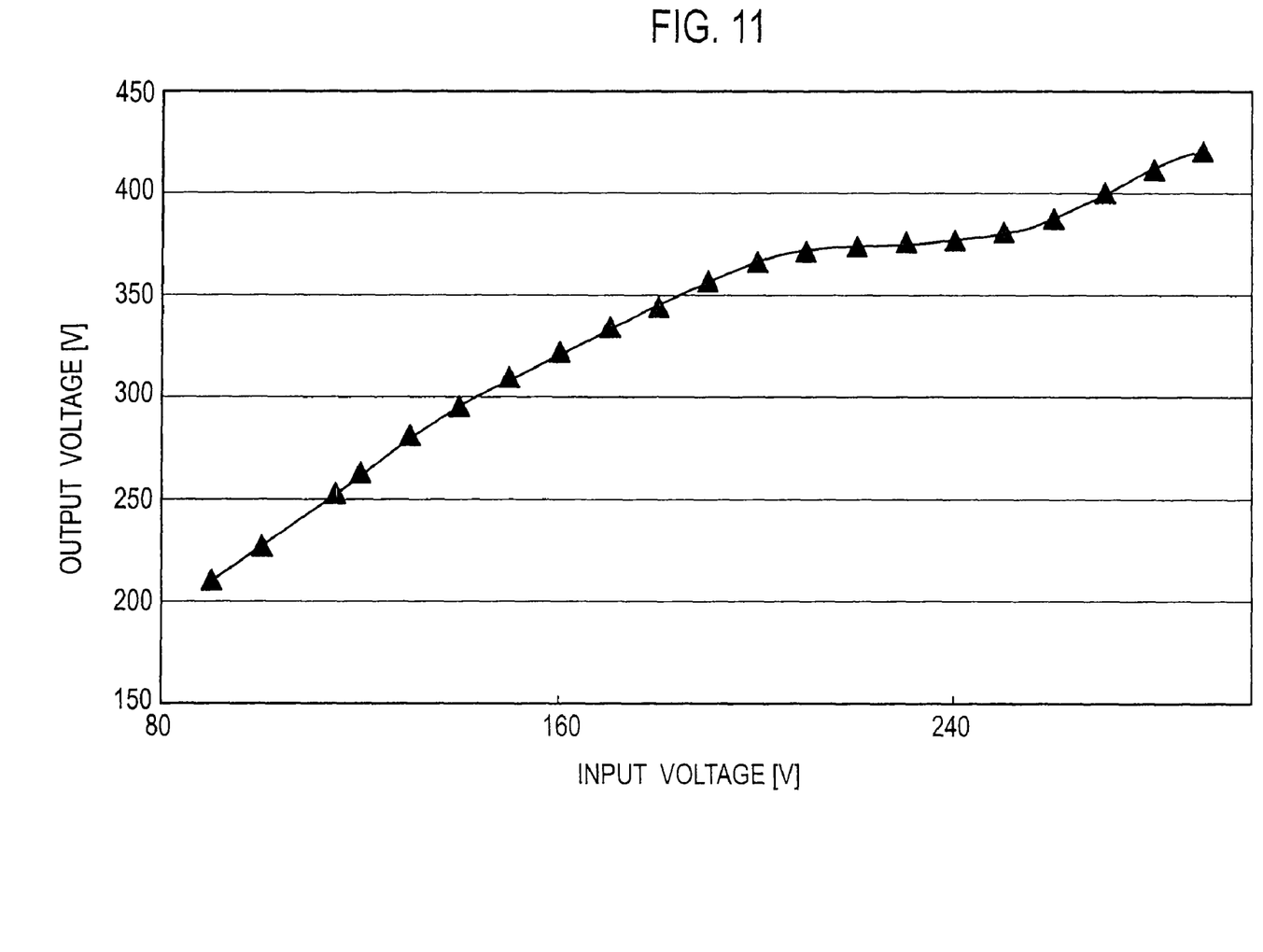
FIG. 11 illustrates a relationship between AC input voltage and PFC output voltage according to Embodiment 2.

Namely, if the PFC output voltage exceeds the predetermined voltage, the pulse width of the delay pulse widens to narrow the pulse width of a gate pulse applied to a switching element Q1 of the power factor correction circuit 2 and decrease a step-up ratio of the power factor correction circuit 2, thereby controlling a step-up quantity. FIG. 11 illustrates a relationship between AC input voltage and PFC output voltage.

Figure 12:
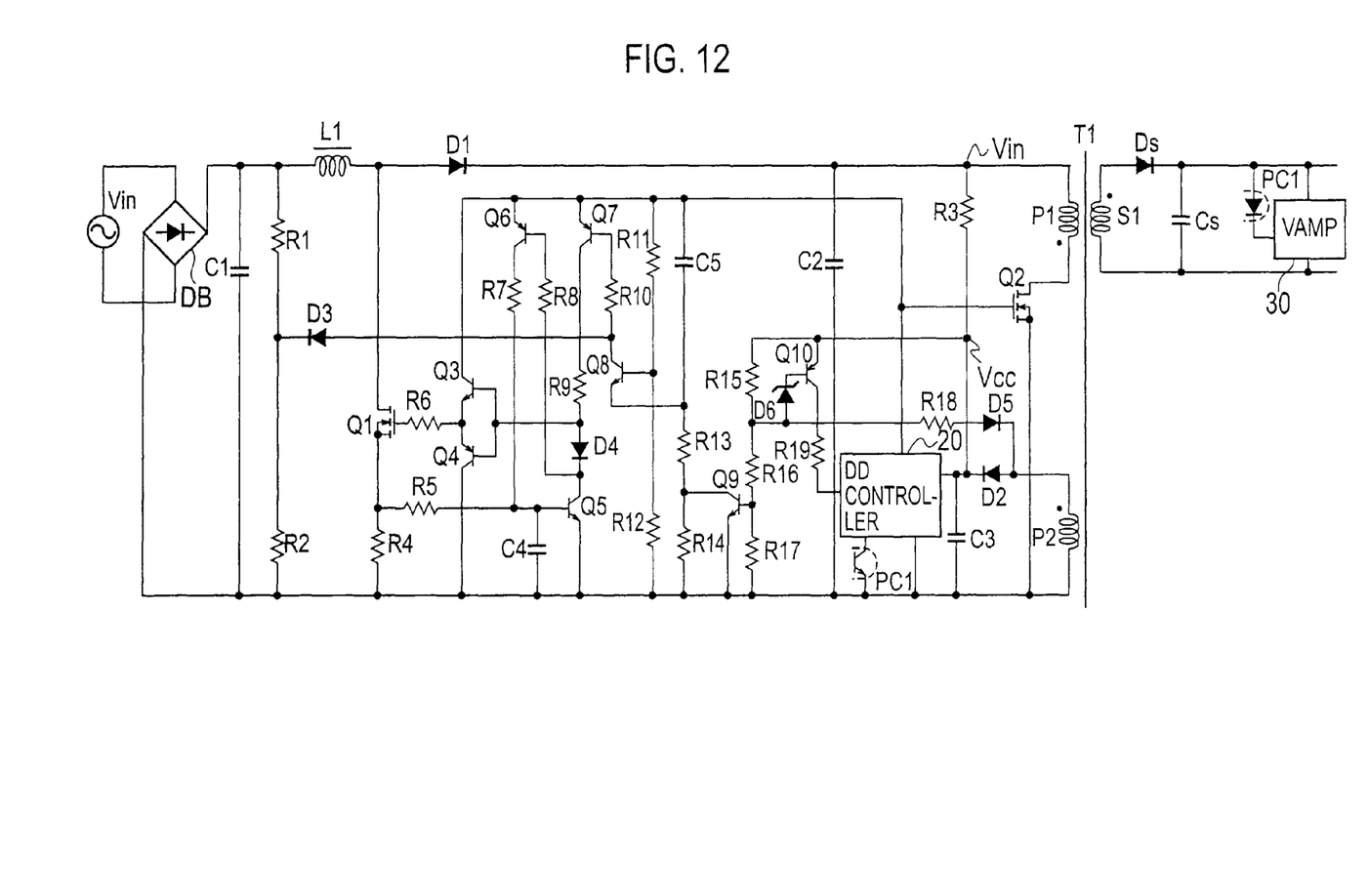
FIG. 12 is a circuit diagram illustrating the details of a PFC controller having an overvoltage detector in the power factor correction circuit according to Embodiment 2.

The PFC controller 10*b* illustrated in FIG. 10 may be provided with an overvoltage detector including a transistor Q10, a resistor R19, and a Zener diode D6 as illustrated in FIG. 12, to detect an excessive PFC output voltage. An emitter of the transistor Q10 is connected to a connection point of the resistors R15 and R3 and a base of the transistor Q10 is connected to a cathode of the Zener diode D6. An anode of the Zener diode D6 is connected to a connection point of the resistors R15, R16, and R18. A collector of the transistor Q10 is connected through the resistor R19 to the DD controller 20.

If the PFC output voltage is excessive, the Zener diode D6 becomes conductive to turn on the transistor Q10 and a collector output of the transistor Q10 is supplied to a latch terminal of the DD controller 20, to shut down the AC-DC converter.

In this way, the power factor correction circuit according to the present embodiment stabilizes the PFC output voltage when the AC input voltage is at or around an upper limit and limits a PFC step-up voltage if the AC input voltage is excessively high.

Embodiment 3

Figure 13:
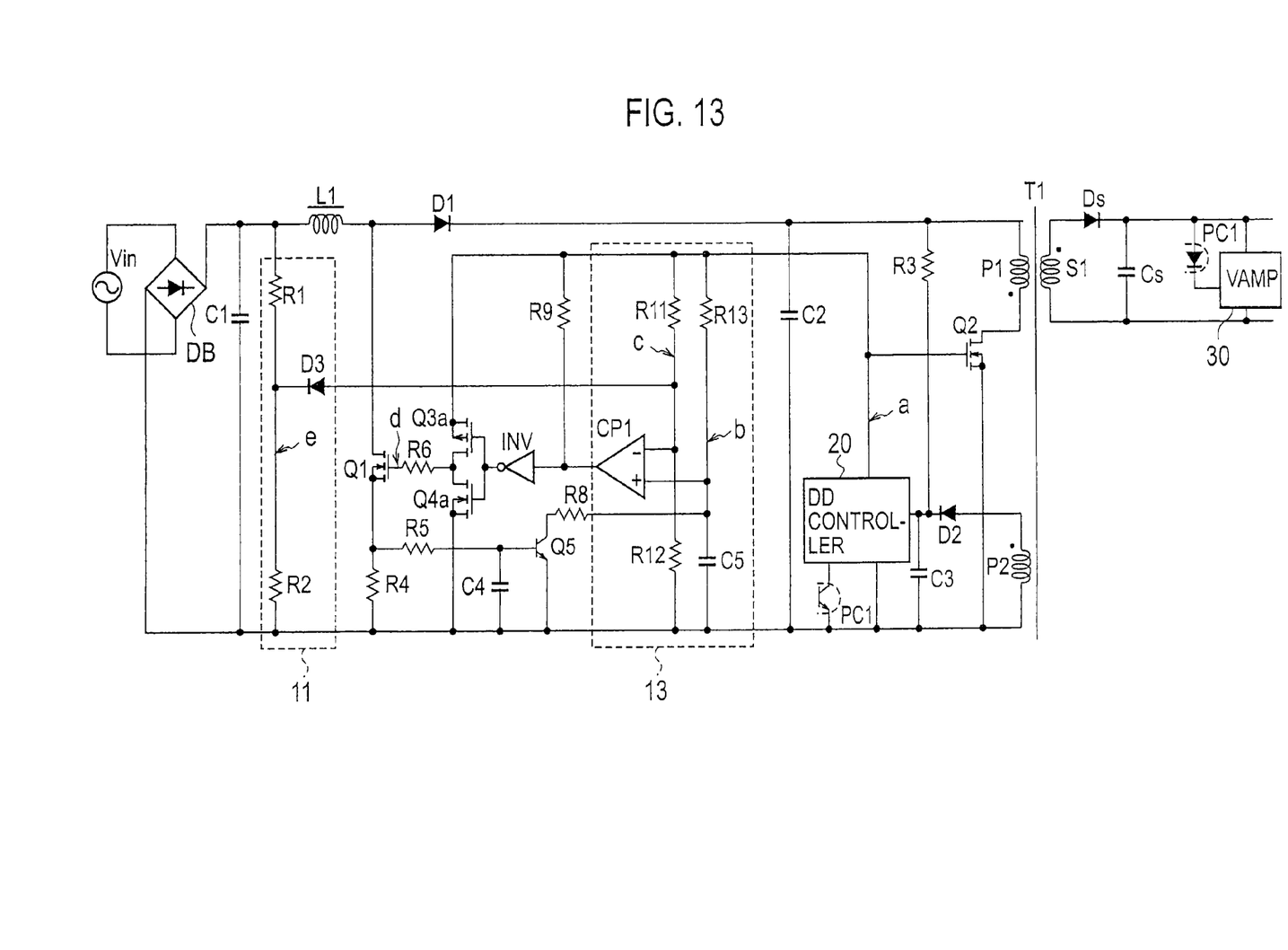
FIG. 13 is a circuit diagram illustrating the details of a PFC controller in a power factor correction circuit according to Embodiment 3 of the present invention.

FIG. 13 is a circuit diagram illustrating the details of a PFC controller (power factor correction controller) in a power factor correction circuit according to Embodiment 3 of the present invention. The delay circuit 12 of Embodiment 1 includes the transistors Q7 and Q8. According to Embodiment 3, a delay circuit 13 includes a comparator CP1. The driver of Embodiment 1 for driving the switching element Q1 includes the transistors Q3 and Q4. According to Embodiment 3, a driver for driving a switching element Q1 includes MOSFETs Q3*a* and Q4*a* and an inverter INV.

In the delay circuit 13 of the present embodiment, connected between a gate side terminal of a switching element Q2 of a DD controller (DC-DC converter controller) 20 and a negative electrode terminal of a rectifier DB are an integrator having a resistor R13 and a capacitor C5 connected in series and also a series circuit of resistors R11 and R12.

A connection point of the resistors R11 and R12 is connected to an inverting input terminal (depicted by "−") of the comparator CP1. A connection point of the resistor R13 and capacitor C5 is connected to a non-inverting input terminal (depicted by "+") of the comparator CP1. A connection point of the resistor R11 and the inverting input terminal of the comparator CP1 is connected through a diode D3 to a connection point of resistors R1 and R2.

An output terminal of the comparator CP1 is connected to a first end of a resistor R9 and an input terminal of the inverter INV. A second end of the resistor R9 is connected to the gate side terminal of the switching element Q2 of the DD controller 20. An output terminal of the inverter INV is connected to a gate of the p-type MOSFET Q3a and a gate of the n-type MOSFET Q4a. A series circuit of the MOSFETs Q3a and Q4a is connected between the gate side terminal of the switching element Q2 of the DD controller 20 and the negative electrode terminal of the rectifier DB. Drains of the MOSFETs Q3a and Q4a are connected to a first end of a resistor R6. A collector of a transistor Q5 is connected through a resistor R8 to a first end of the capacitor C5.

Figure 14:
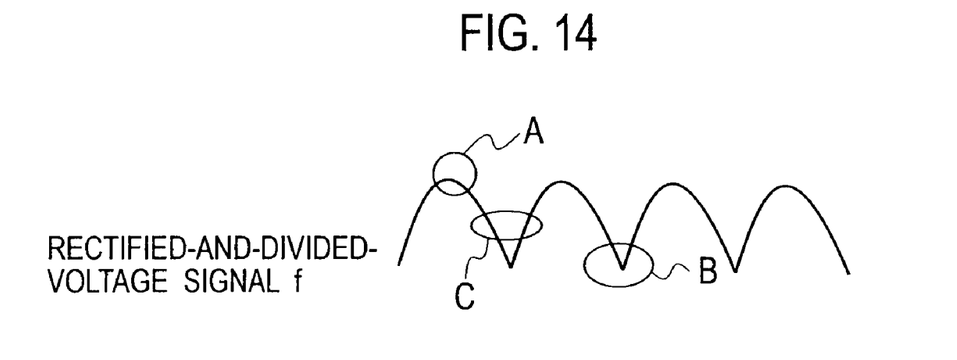
FIG. 14 illustrates a rectified-and-divided-voltage signal in the PFC controller of FIG. 13 prepared from an AC input voltage.
Figure 15:
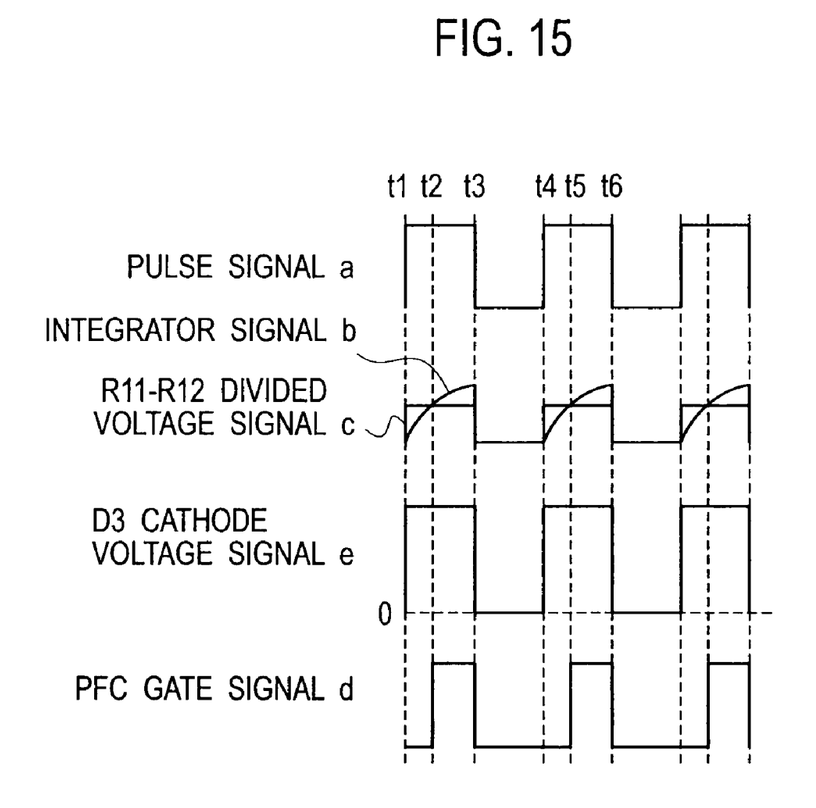
FIG. 15 is a timing chart illustrating signals in a delay circuit in the PFC controller of FIG. 13, these signals being generated in a top zone of the rectified-and-divided-voltage signal under rated load.
Figure 16:
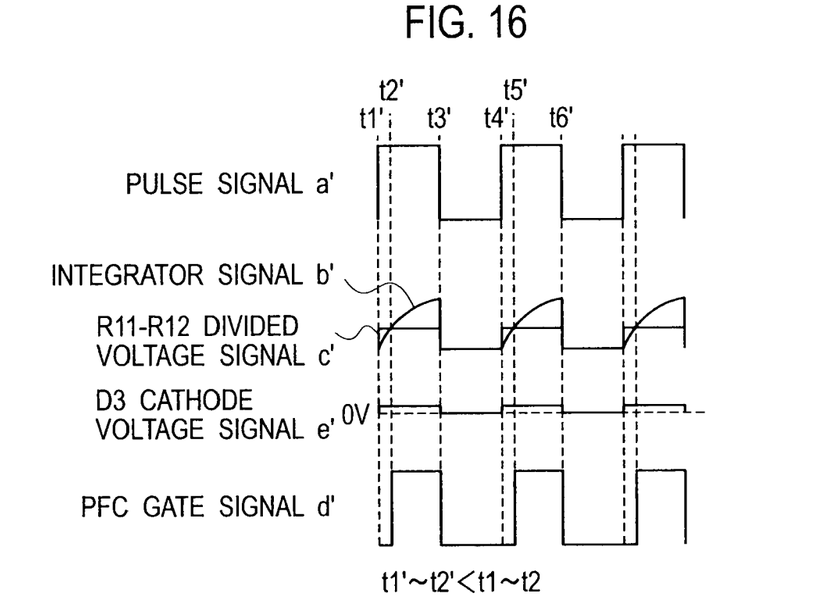
FIG. 16 is a timing chart illustrating signals in the delay circuit in the PFC controller of FIG. 13, these signals being generated in a middle zone of the rectified-and-divided-voltage signal under rated load.
Figure 17:
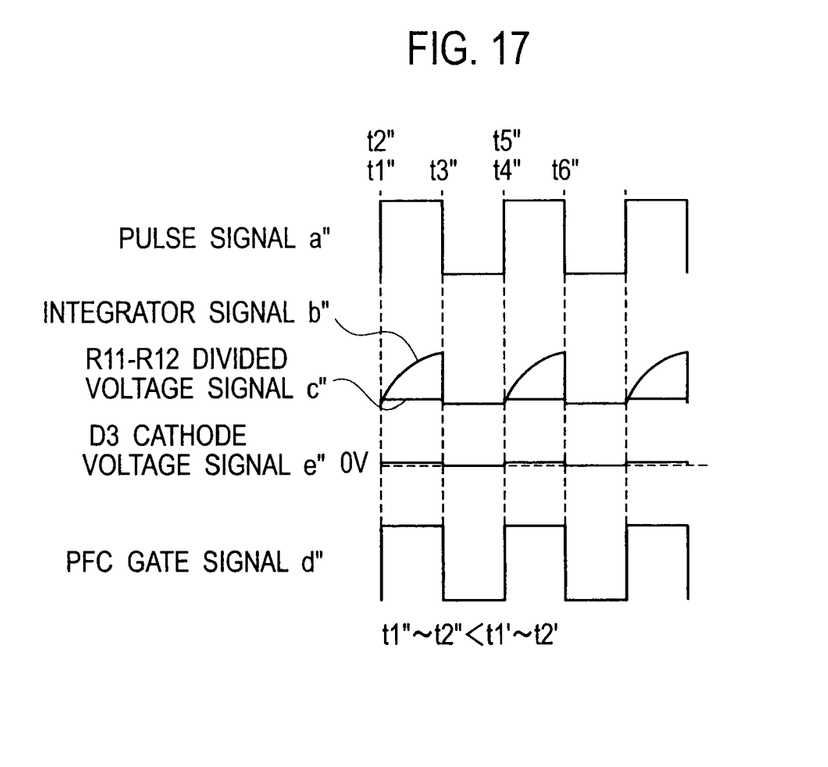
FIG. 17 is a timing chart illustrating signals in the delay circuit in the PFC controller of FIG. 13, these signals being generated in a bottom zone of the rectified-and-divided-voltage signal under rated load.

Operation of the PFC controller according to the present embodiment illustrated in FIG. 13 will be explained with reference to FIGS. 14 to 17. FIG. 14 illustrates a rectified-and-divided-voltage signal f formed by rectifying an AC input voltage. FIG. 15 is a timing chart illustrating signals in the delay circuit 13 when the rectified-and-divided-voltage signal f is in a top zone A under rated load. FIG. 16 is a timing chart illustrating signals in the delay circuit 13 when the rectified-and-divided-voltage signal f is in a middle zone C under rated load. FIG. 17 is a timing chart illustrating signals in the delay circuit 13 when the rectified-and-divided-voltage signal f is in a bottom zone B under rated load.

A pulse signal a from the DD controller 20 is divided by the resistors R11 and R12 into a divided-pulse-voltage signal (reference voltage) c that is supplied to the inverting input terminal of the comparator CP1.

The connection point of the resistor R13 and capacitor C5 of the integrator provides an integrator signal b that is supplied to the non-inverting input terminal of the comparator CP1. The comparator CP1 compares the integrator signal b (a charging voltage of the capacitor C5) with the divided-pulse-voltage signal c and sets a delay time for a PFC gate signal d.

The connection point of the resistors R11 and R12 is connected to the anode of the diode D3. When a rectified voltage prepared from an AC input voltage gradually decreases below a forward threshold voltage of the diode D3, a divided current passes from the resistor R11 to the resistor R2 through the diode D3 as well as the resistor R12. As results, the divided-pulse-voltage signal c from the resistors R11 and R12 decreases.

When the rectified voltage changes from the top zone A through the middle zone C to the bottom zone B as illustrated in FIG. 14, the divided-pulse-voltage signal c gradually decreases as illustrated in FIGS. 15 to 17, and accordingly, the delay time gradually becomes shorter to provide elongated PFC gate signals d, d', and d" as illustrated in FIGS. 15 to 17.

In this way, Embodiments 1 to 3 each change the ON pulse width of a PFC gate signal in response to an AC input voltage and drive the switching element Q1 according to the PFC gate signal. The power factor correction circuit according to each embodiment is simple, inexpensive, and capable of correcting a power factor in accordance with the new requirement LEVEL V of ENERGY STAR.

The power factor correction circuit of each embodiment is capable of controlling the power factor and step-up quantity of a PFC output voltage and forming a simple, inexpensive, and efficient active filter without an exclusive control IC.

Since each embodiment changes the pulse width of a delay pulse signal according to an AC input voltage, the embodiment has an effect of suppressing jitters during an ON period of the switching element during which an oscillation frequency is fixed and an effect of minimizing noise such as EMI.

As mentioned above, the power factor correction circuit according to any one of the embodiments of the present invention employs the delay circuit that generates a delay pulse signal having a pulse width proportional to a rectified voltage prepared by rectifying an input AC voltage and synthesizes the delay pulse signal and a first pulse signal provided by the DC-DC converter into a second pulse signal. The second pulse signal has an ON pulse whose pulse width is dependent on the rectified voltage. The second pulse signal is used to turn on/off the switching element. Accordingly, the power factor correction circuit is simple, inexpensive, and capable of correcting a power factor in accordance with the new requirement LEVEL V of ENERGY STAR.

This application claims benefit of priority under 35USC §119 to Japanese Patent Application No. 2008-152996, filed on Jun. 11, 2008, the entire content of which is incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A power factor correction circuit configured to step up and power-factor-correcting a rectified voltage of an AC input voltage through an ON/OFF operation of a switching element and supply a stepped-up output voltage to a DC-DC converter that is driven with a first pulse signal, the power factor correction circuit comprising:
   a delay circuit configured to receive the first pulse signal whose pulse width corresponds to an output voltage of the DC-DC converter, generate a delay pulse signal whose pulse width corresponds to the rectified voltage in response to an ON pulse of the first pulse signal, and synthesize the first pulse signal and the delay pulse signal into a second pulse signal; and
   a driver configured to drive the switching element according to the second pulse signal.

2. The power factor correction circuit of claim 1, wherein the delay circuit has a corrector configured to narrow a pulse width of the delay pulse signal if the stepped-up output voltage is smaller than a predetermined voltage.

3. The power factor correction circuit of claim 1, wherein the second pulse signal generated by the delay circuit has a pulse width that is narrower than the pulse width of the first pulse signal by the pulse width of the delay pulse signal.

4. The power factor correction circuit of claim 1, wherein as the rectified voltage becomes larger, the delay circuit widens the pulse width of the delay pulse signal and the pulse width of the second pulse signal is narrower than the pulse width of the first pulse signal.

5. The power factor correction circuit of claim 1, wherein the delay circuit narrows the pulse width of the delay pulse signal as the rectified voltage becomes smaller, and when the rectified voltage enters a bottom zone, zeroes the pulse width of the delay pulse signal.

6. The power factor correction circuit of claim 1, wherein the delay circuit reduces the pulse width of the second pulse signal narrower than the pulse width of the first pulse signal as load on the DC-DC converter becomes lighter, and when the load on the DC-DC converter decreases below a predetermined load power, zeroes the pulse width of the second pulse signal.

7. The power factor correction circuit of claim 1, further comprising an overcurrent protector configured to prevent an overcurrent from passing through the switching element and latch the overcurrent protecting operation for each ON pulse of the first pulse signal.

* * * * *